US010056779B2

United States Patent
Hu et al.

(10) Patent No.: US 10,056,779 B2
(45) Date of Patent: Aug. 21, 2018

(54) POWER SOURCE ADAPTOR FOR CHARGING DIRECTLY AND MOBILE TERMINAL

(71) Applicant: HISENSE MOBILE COMMUNICATIONS TECHNOLOGY CO., LTD., Qingdao (CN)

(72) Inventors: Ermeng Hu, Qingdao (CN); Xintao Zhang, Qingdao (CN); Jianmin Pi, Qingdao (CN); Wenjuan Du, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 204 days.

(21) Appl. No.: 15/065,324

(22) Filed: Mar. 9, 2016

(65) Prior Publication Data
US 2017/0040814 A1     Feb. 9, 2017

(30) Foreign Application Priority Data

Aug. 5, 2015   (CN) .......................... 2015 1 0473312

(51) Int. Cl.
*H02J 7/00*       (2006.01)
*H02J 7/04*       (2006.01)

(52) U.S. Cl.
CPC ............ *H02J 7/045* (2013.01); *H02J 7/0004* (2013.01); *H02J 2007/0062* (2013.01); *H02J 2007/0096* (2013.01)

(58) Field of Classification Search
CPC ....................................................... H02J 7/045
USPC ............................................................ 320/114
See application file for complete search history.

(56) References Cited

U.S. PATENT DOCUMENTS

| | | | | |
|---|---|---|---|---|
| 9,362,773 | B2* | 6/2016 | Tuli ..................... | G06F 1/1632 |
| 9,812,878 | B1* | 11/2017 | Stieber ................ | H02J 7/0021 |
| 2011/0309789 | A1* | 12/2011 | Prasad ................. | H02J 7/0052 |
| | | | | 320/107 |

FOREIGN PATENT DOCUMENTS

| | | |
|---|---|---|
| CN | 102170160 A | 8/2011 |
| CN | 104467139 A | 3/2015 |
| WO | WO-2005048378 A2 | 5/2005 |

OTHER PUBLICATIONS

Office Action from corresponding Chinese Application No. 201510473312.9, dated Jun. 28, 2017 (4 pages).

* cited by examiner

*Primary Examiner* — Suchin Parihar
(74) *Attorney, Agent, or Firm* — Harness, Dickey & Pierce, P.L.C.

(57) ABSTRACT

The application discloses a power source adaptor for charging directly and a mobile terminal, where the power source adaptor for charging directly is timed to communicate with a mobile terminal which is a charging object, in the UART communication mode to obtain a change in voltage of a battery in the mobile terminal, adjusts dynamically a volt value of charging voltage output by the power source adaptor for charging directly according to the varying voltage of the battery, and charges directly the battery in the mobile terminal using the charging voltage.

9 Claims, 7 Drawing Sheets

US 10,056,779 B2

POWER SOURCE ADAPTOR FOR CHARGING DIRECTLY AND MOBILE TERMINAL

CROSS-REFERENCE TO RELATED APPLICATION

This application claims the benefit and priority of Chinese Patent Application No. 201510473312.9 filed Aug. 5, 2015. The entire disclosure of the above application is incorporated herein by reference.

FIELD

The present disclosure relates to the field of Direct-Current (DC) charging and particularly to a power source adaptor for charging rapidly a battery in a mobile terminal, and a mobile terminal.

BACKGROUND

This section provides background information related to the present disclosure which is not necessarily prior art.

At present, portable electronic products (or mobile terminals) have been widely applied in numerous aspects of people's life, and have become a leading factor in the development of the semiconductor industry. Moreover more and more types of portable electronic products are emerging, e.g., MP3, MP4, PMP, MID, mobile TV terminals, tablet computers, etc., along with the constant development of sciences and technologies, and these portable electronic products can provide audio and video playing, and other entertainment functions, and also provide navigation, an access to the Internet, business, disease diagnosis, and other service functions to thereby greatly facilitate people's life.

For the sake of portability, the portable electronic products are generally provided with chargeable batteries built in the products to power system circuits in the products. As an increasing number of functions supported by the portal electronic products are emerging, their system circuits also consume more and more power, and given a limited capacity of the batteries, the products operate for a shorter and shorter period of time after the batteries are charged, so that the batteries have to be charged more and more frequently.

SUMMARY

This section provides a general summary of the disclosure, and is not a comprehensive disclosure of its full scope or all of its features.

In an aspect, the application provides a power source adaptor for charging directly comprising a charging interface, an AC to DC converting unit, and a controlling unit, wherein the charging interface is configured to be externally connected with a mobile terminal, and including a power source pin, a ground pin, and two communication pins disconnected from each other; the AC to DC converting unit is configured to convert an external AC input power source into charging voltage required for the mobile terminal, and to output the charging voltage via the charging interface; and the controlling unit connected with the charging interface is configured, after the charging interface is connected with the mobile terminal, to conduct UART communication with the mobile terminal through the communication pins to adjust the charging voltage output by the AC to DC converting unit.

In another aspect, the application further provides a mobile terminal including a battery, a USB interface, a microprocessor, a direct charging switch, and a power source managing chip, wherein the battery is configured to store electrical energy; the USB interface is configured to be engaged with an external device; the microprocessor is configured, upon detecting an external device being inserted into the USB interface, to identify whether the inserted external device is a power source adaptor for charging directly in a UART communication mode, if the external device is the power source adaptor for charging directly, to control charging voltage output by the power source adaptor for charging directly to charge the battery directly, and the microprocessor is further configured to output a switch control signal; and the direct charging switch is configured to control the mobile terminal to be switched between a charging mode in which the battery is charged through the power source managing chip, and a charging mode in which the battery is charged through the direct charging switch, in response to the switch control signal.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

This application proposes a power source adaptor for charging directly outputting dynamically adjustable voltage to address such a problem that if a mobile terminal in which a chargeable battery is built is charged using a normal power source adaptor, then charging voltage output by the normal power source adaptor will be constant, and charging current has to be controlled by a power source managing chip not to be too high, typically below 1.5 A, so it may take a long period of time to charge the drained battery until the battery is fully charged. The power source adaptor for charging directly can exchange data with the mobile terminal preferably in the UART (Universal Asynchronous Receiver/Transmitter) communication mode, adjust duly a voltage value of the charging voltage output by the power source adaptor for charging directly according to a change in voltage of the battery being charged, and charge directly the battery in the mobile terminal using the dynamically varying charging voltage, so that the charging current can be maintained at a higher current value, typically up to approximately 4 A, and the battery can be charged directly at the larger current to thereby significantly speed up charging and greatly shorten the period of time for charging.

Firstly hardware configurations of the power source adaptor for charging directly and the mobile terminal which can be charged by the power source adaptor for charging directly will be described below.

Figure 1:
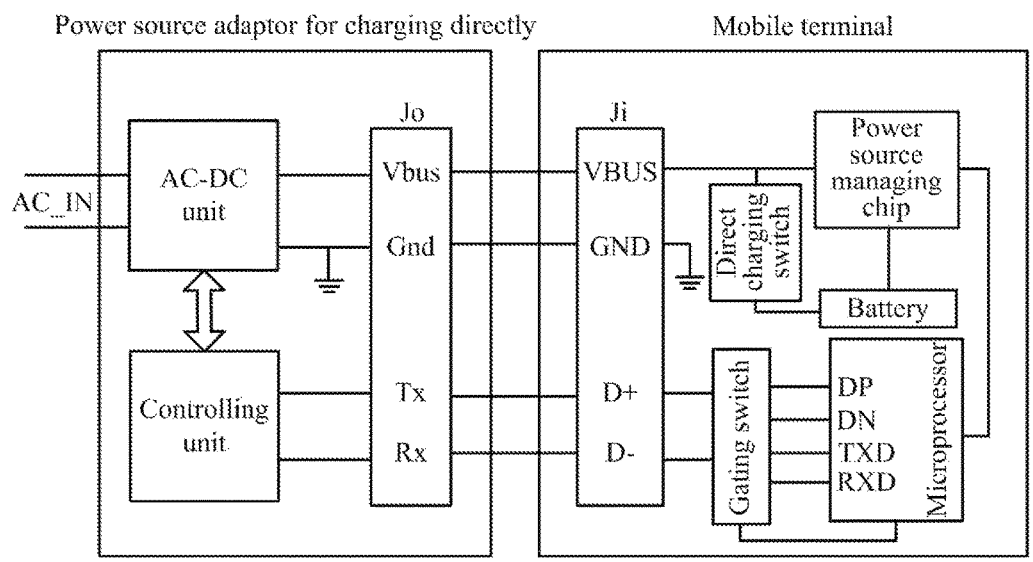
FIG. 1 is a circuit scheme block diagram of an embodiment of a power source adaptor for charging directly connected with a mobile terminal according to this application.

As illustrated in FIG. 1, in order to maintain the existing traditional charging function of the mobile terminal so that the mobile terminal can be normally engaged with and charged by the existing host and the normal power source adaptor, the existing charging interface of the mobile terminal which can be charged by the power source adaptor for charging directly according to this embodiment can be maintained, that is, a reused interface for both charging and transmitting data can be maintained, e.g., a currently widely applied USB interface Ji, so that the mobile terminal can be engaged with and powered by the normal power source adaptor and the computer host in the market, which are currently manufactured by the majority of the manufactures. For the power pin VBUS in the USB interface Ji, in this embodiment, one branch thereof is connected with a power source managing chip in the mobile terminal, and another branch thereof is connected with the battery through a direct charging switch, which can be any type of controllable switch element with low conduction impedance through which large current can pass, e.g., controllable silicon, an MOS transistor, etc., to receive a switch control signal output by a microprocessor in the mobile terminal to selectively switch between the normal charging mode and the rapid charging mode. For the ground pin GND in the USB interface Ji, it can be well connected with system ground of the mobile terminal so that the mobile terminal can be grounded together with the external charging device if the mobile terminal is engaged with the external device. For the differential data pins D+ and D− in the USB interface Ji, they are designed to be connected with the microprocessor through a gating switch, which can be a double-pole double-throw switch, to receive a control signal output by the microprocessor, where the differential data pins D+ and D− of the USB interface Ji are connected by default with the differential data interfaces DP and DN of the microprocessor through the gating switch; and if it is detected that the externally connected charging device is neither the host nor the normal power source adaptor, then the gating switch will be controlled by the microprocessor to switch the differential data pins D+ and D− of the USB interface Ji to be connected with the UART interfaces TXD and RXD of the microprocessor to thereby identify whether the inserted external device is the power source adaptor for charging directly, in the UART communication mode.

The microprocessor in the mobile terminal can be designed to initiate on its own initiative a communication command to the externally connected charging device in the UART communication mode after the differential data pins D+ and D− of the USB interface Ji are switched to be connected with the UART interfaces TXD and RXD of the microprocessor, and if a valid command fed back by the external charging device is received, to determine that the inserted external device is the power source adaptor for charging directly; and if there is no valid command fed back, to disconnect the UART interfaces TXD and RXD of the microprocessor from the differential data pins D+ and D− of the USB interface Ji without starting the charging mode, or to further output an alert of "Inserted Device Can Not Be Identified".

In this embodiment, the power source adaptor for charging directly is configured in the UART communication mode instead of the I2C bus communication mode for the reason that there is small communication traffic, a low rate, and a high anti-interference capability of UART communication in the asynchronous communication mode to thereby avoid effectively communication between the mobile terminal and the power source adaptor from becoming highly instable due to interference from current, impedance, voltage, and other signals so that the mobile terminal can be charged stably and rapidly at large current by the power source adaptor for charging directly to thereby improve the safety of the mobile terminal being charged.

Of course, if the influence above is not taken into account, then communication between the mobile terminal and the power source adaptor for charging directly can be designed in another communication mode than UART (e.g., the I2C bus communication mode, etc.) although this embodiment will not be limited thereto.

Figure 2:
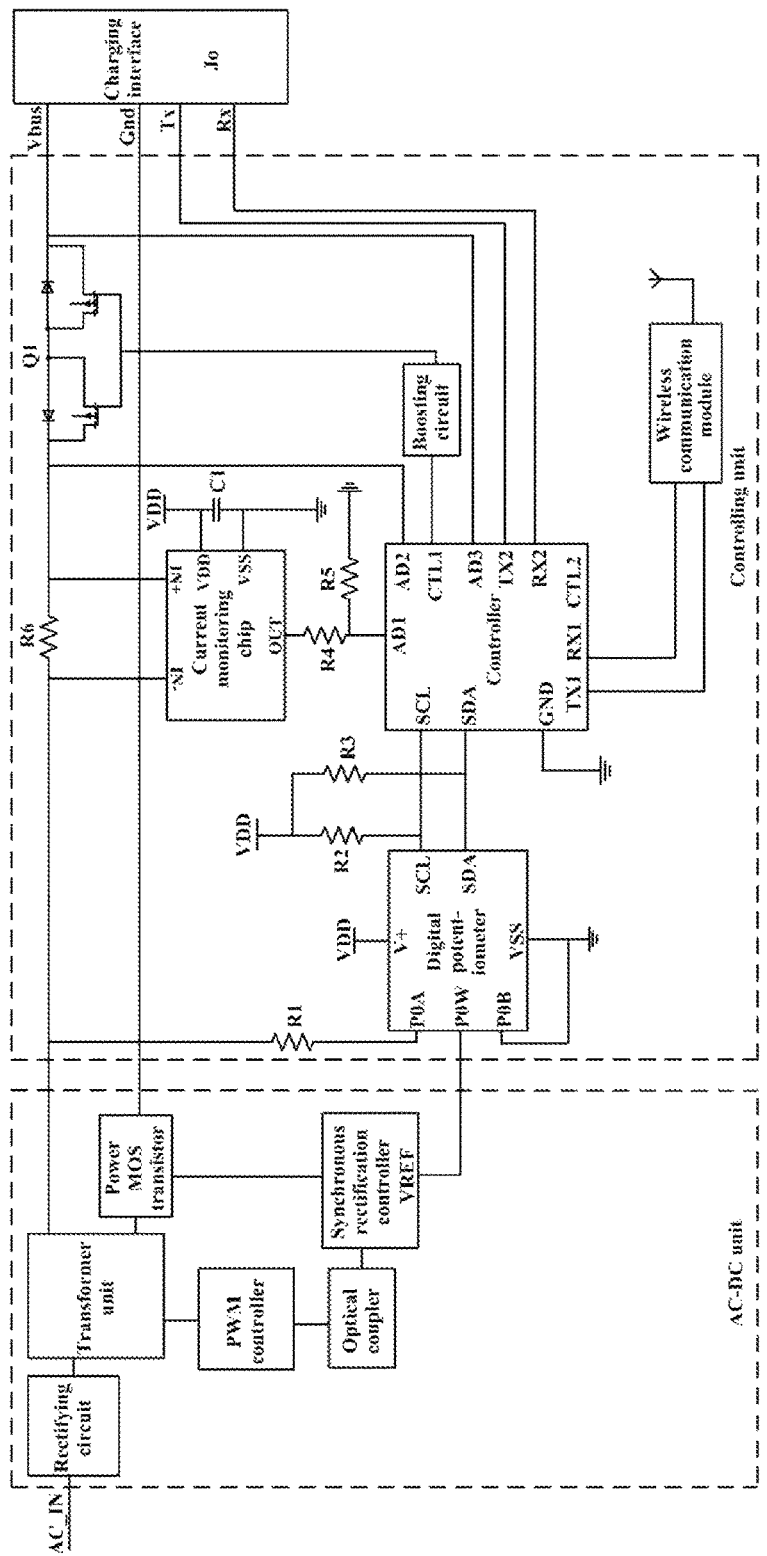
FIG. 2 is a particular circuit scheme diagram of an embodiment of the power source adaptor for charging directly in FIG. 1.

FIG. 2 illustrates a schematic diagram of circuit components of a power source adaptor for charging directly supporting UART communication, where the power source adaptor for charging directly generally includes three components, i.e., a charging interface Jo, a controlling unit, and an AC-DC (converting) unit, as illustrated in FIG. 1 as well, where a power source pin Vbus, a ground pin Gnd, and two communication pins Tx and Rx are arranged in the charging interface Jo. The power source pin Vbus configured to transmit a charging power source is connected with the AC-DC unit to transmit a DC power source converted and output by the AC-DC unit to the power source pin VBUS of the USB interface Ji of the mobile terminal to charge the mobile terminal. The ground pin Gnd is connected with the system ground of the power source adaptor for charging directly, and after the power source adaptor for charging directly is engaged with the mobile terminal, the ground pin Gnd is connected with the ground pin GND of the USB interface Ji of the mobile terminal so that both of the ground pins are grounded together. The two communication pins Tx and Rx of the charging interface Jo are connected with the UART interface of the controlling unit, and if the power source adaptor for charging directly is engaged with the mobile terminal, then the communication pins are connected respectively with the differential data pins D+ and D of the USB interface Ji of the mobile terminal for UART communication between them, and the volt value of the charging voltage output by the AC-DC unit is adjusted according to received control information so that the mobile terminal can be charged differently as required in different phases.

In order to adjust dynamically the charging voltage output by the AC-DC unit, in this embodiment, a rectifying circuit, a transformer unit, a synchronous rectification controller, a PWM controller, an optical coupler, a power MOS transistor, and other elements are designed in the AC-DC unit; and a controller, a digital potentiometer, a current monitoring chip, a boosting circuit, and other elements are designed in the controlling unit, as illustrated in FIG. 2, where the rectifying circuit receives an AC input power source AC_IN provided by a mains grid, rectifies the AC input power source into a DC power source, and outputs the DC power source to the transformer unit for transformation into the charging voltage to charge the mobile terminal. The controller has the UART interfaces TX2 and RX2 thereof connected with the communication pins Tx and Rx of the charging interface Jo for UART communication with the microprocessor in the mobile terminal to exchange a handshake instruction, and receives the control information sent by the mobile terminal, upon the successful handshake to adjust dynamically the volt value of the charging voltage output by the AC-DC unit according to the varying voltage of the battery in the mobile terminal.

In order to adjust the output voltage of the AC-DC unit, in this embodiment, the digital potentiometer is designed in the controlling unit to be connected with the controller. The controller generates a voltage adjusting instruction based on the received control information, and sends the voltage adjusting instruction to the digital potentiometer to change the resistance value of a valid resistor of the digital potentiometer. In this embodiment, the controller can be connected and communicate with the digital potentiometer preferably over an I2C bus, as illustrated in FIG. 2, to transmit the voltage adjusting instruction. In order to ensure the stability of the signal being transmitted, in this embodiment, a voltage pull-up circuit is further connected over the I2C bus, for example, a clock line SCL and a data line SDA of the I2C bus are connected with a DC power source VDD respectively through pull-up resistors R2 and R3 to thereby improve the anti-interference capability of the signal being transmitted.

The DC power source VDD can be embodied as a set of small electromagnetic coils designed separately in the transformer unit. The turn ratio of a primary coil and a secondary coil in the set of small electromagnetic coils is configured to transform the voltage of the DC power source output by the rectifying circuit into the desirable DC power source VDD to supply power to those components needing DC operating voltage in the power source adaptor for charging directly, e.g., the controller, the digital potentiometer, the current detecting chip, and other components to thereby enable them to operate as desired.

The digital potentiometer is a resistance-adjustable resistor element in which a resistor body is built. In this embodiment, the resistor body connected in series with a current-limiting resistor R1 is connected between the anode of a secondary coil in another set of electromagnetic coils (referred below simply to as the other set of electromagnetic coils) in the transformer unit and the ground. One end P0A of the resistor body can be connected with the anode of the secondary coil in the other set of electromagnetic coils through the current-limiting resistor R1 connected in series, and the other end P0B of the resistor body can be grounded. A central tap P0W of the resistor body is connected with a reference voltage pin VREF of the synchronous rectification controller, and if the resistance value of the valid resistor of the digital potentiometer varies, then the volt value of the charging voltage output by the other set of electromagnetic coils in the transformer unit will be adjusted in order to maintain the reference voltage on the reference voltage pin VREF of the synchronous rectification controller. In order to adjust the volt value of the charging voltage, the synchronous rectification controller adjusts its output control signal according to the varying resistance value of the valid resistor of the digital potentiometer, and transmits the control signal to the PWM controller after the control signal is optic-electrically isolated by the optical coupler, to thereby adjust a duty ratio of a PWM signal output by the PWM controller.

The PWM signal is transmitted to the transformer unit, and can be transmitted to a switch transistor connected in series with the secondary coil in the other set of electromagnetic coils, to control the switch transistor to be switched on and off to thereby adjust the switching timing of the other set of electromagnetic coils so as to further adjust the volt value of the charging voltage output by the secondary coil thereof for the purpose of adjusting dynamically the charging voltage.

In this embodiment, the charging voltage output by the transformer unit can be finely adjusted in the range of 3.6V to 12V to thereby charge different mobile terminals as required in reality.

In order to achieve the stability of the charging voltage output by the transformer unit, in this embodiment, instead of a traditional rectification scheme in which a diode is connected in series on a charging voltage transmission line, the power MOS transistor is connected on the charging voltage transmission line and switched on or off by the switching signal output by the synchronous rectification controller to thereby shape the waveform of the charging voltage output by the transformer unit.

In this embodiment, the power MOS transistor is preferably embodied as an NMOS transistor connected between the cathode of the secondary coil in the other set of electromagnetic coils and the ground pin Gnd of the charging interface Jo. Since the power source adaptor for charging directly supports an output of large current, if the charging voltage output by the transformer unit is shaped by the diode, then power consumption of the power source adaptor for charging directly may be increased and the efficiency in charging may be lowered due to a significant voltage drop across the conducting diode. In this embodiment, the charging voltage is shaped by the power MOS transistor, and since the power MOS transistor has low inner resistance and supports large current passing, systematic power consumption of the power source adaptor for charging directly can be lowered effectively and the efficiency in charging the mobile terminal can be improved.

In order to monitor in real time charging current output by the transformer unit to thereby improve the safety in charging, in this embodiment, a current monitoring unit is further arranged in the power source adaptor for charging directly to monitor in real time charging current Ichg output via the charging interface Jo, and to feed the charging current back to the controller. The current monitoring unit further includes a sampling resistor R6 and a current monitoring chip, as illustrated in FIG. 2. The sampling resistor R6 is connected in series in a transmission line of the charging current, and preferably between the anode of the secondary coil in the other set of electromagnetic coils in the transformer unit and the power source pin Vbus of the charging interface Jo. Inputs −IN and +IN of the current monitoring chip are connected with two ends of the sampling resistor R6 to acquire a voltage drop across the sampling resistor R6, and after the voltage drop is amplified, the magnitude of the charging current is calculated from the voltage drop and the resistance value of the sampling resistor R6. The current monitoring chip generates sample voltage corresponding to the calculated magnitude of the charging current according to the calculated magnitude of the charging current, and transmits the sample voltage to an ADC interface AD1 of the controller through an output OUT thereof, and the sample voltage is analog-to-digital converted by the controller into the magnitude of the charging current, so the controller can monitor in real time the charging current.

If the range of the amplitude of the sample voltage output by the current monitoring chip exceeds an interface voltage range specified by the ADC interface AD1 of the controller, then the ADC interface of the controller may be damaged. In order to protect the controller, an bleeder circuit can be additionally arranged between the output OUT of the current, monitoring chip and the ADC interface AD1 of the controller, e.g., a resistor bleeder circuit composed of resistors R4 and R5, to adjust the voltage signal output by the current monitoring chip within the interface voltage range acceptable to the AD1 interface of the controller so as to avoid the ADC interface AD1 of the controller from being damaged due to the input voltage being too high.

In order to improve the safety in charging so that the power source adaptor for charging directly can have the charging power source disconnected rapidly upon abnormal charging occurring to thereby avoid the mobile terminal from being damaged, in this embodiment, a switch transistor Q1 supporting large current passing is further arranged in the charging power source transmission line of the power source adaptor for charging directly so that a switch voltage, generated by the boosting circuit, sufficient to drive the switch transistor Q1 to be switched on is transmitted to a control pole of the switch transistor Q1 to control the switch transistor Q1 to be switched on or off to thereby have the charging power source transmission line connected or disconnected.

In this embodiment, the switch transistor is preferably embodied as a pair of NMOS transistors Q1 in which parasitic diodes connected in anti-parallel are built, as illustrated in FIG. 2. The pair of NMOS transistors Q1 are switched on and connected in series in the transmission line of the charging power source, where the source electrodes of the two NMOS transistors in the pair of NMOS transistors Q1 can be connected, the drain electrodes of the two NMOS transistors can be connected respectively with the anode of the secondary coil in the other set of electromagnetic coils in the transformer unit, and the power source pin Vbus of the charging interface Jo; and then the gate electrodes of the two NMOS transistors can be connected with the boosting circuit. An enable terminal of the boosting circuit is connected with the controller to receive an enable signal output by the controller. During charging, if the controller detects normal charging current, then the controller will output the valid enable signal to control the boosting circuit to be enabled into operation to boost the DC power source output by the transformer unit to the switch voltage higher than the volt value of the charging voltage, and the switch voltage is output to the gate electrodes of the pair of NMOS transistors Q1 to control the pair of NMOS transistors Q1 to be switched on to have the transmission line of the charging power source connected, so that the charging power source can be output to the externally connected mobile terminal to charge the battery in the mobile terminal. If the controller detects abnormal charging current or receives control information sent by the mobile terminal to stop charging, then the controller will output the invalid enable signal to control the boosting circuit to stop operating. At this time the pair of NMOS transistors Q1 is switched off due to the disappearing voltage at the gate electrodes thereof, to thereby have the transmission line of the charging power source disconnected to block the charging power source from outputting to the outside, so that the power source adaptor for charging directly can be controlled to stop supplying power to the mobile terminal.

At the mobile terminal side, in order to enable the mobile terminal in which the chargeable battery is built, to identify automatically and accurately the type of the currently inserted external device so as to invoke different charging management modes according to different charging characteristics of different external devices to thereby make reasonable use of charging resources, this embodiment proposes a charging method as described below for the host and the normal power source adaptor, and the power source adaptor for charging directly according to this embodiment in addition to the circuitry adaptations as illustrated in FIG. 1 to the hardware configuration of the mobile terminal.

Figure 3:
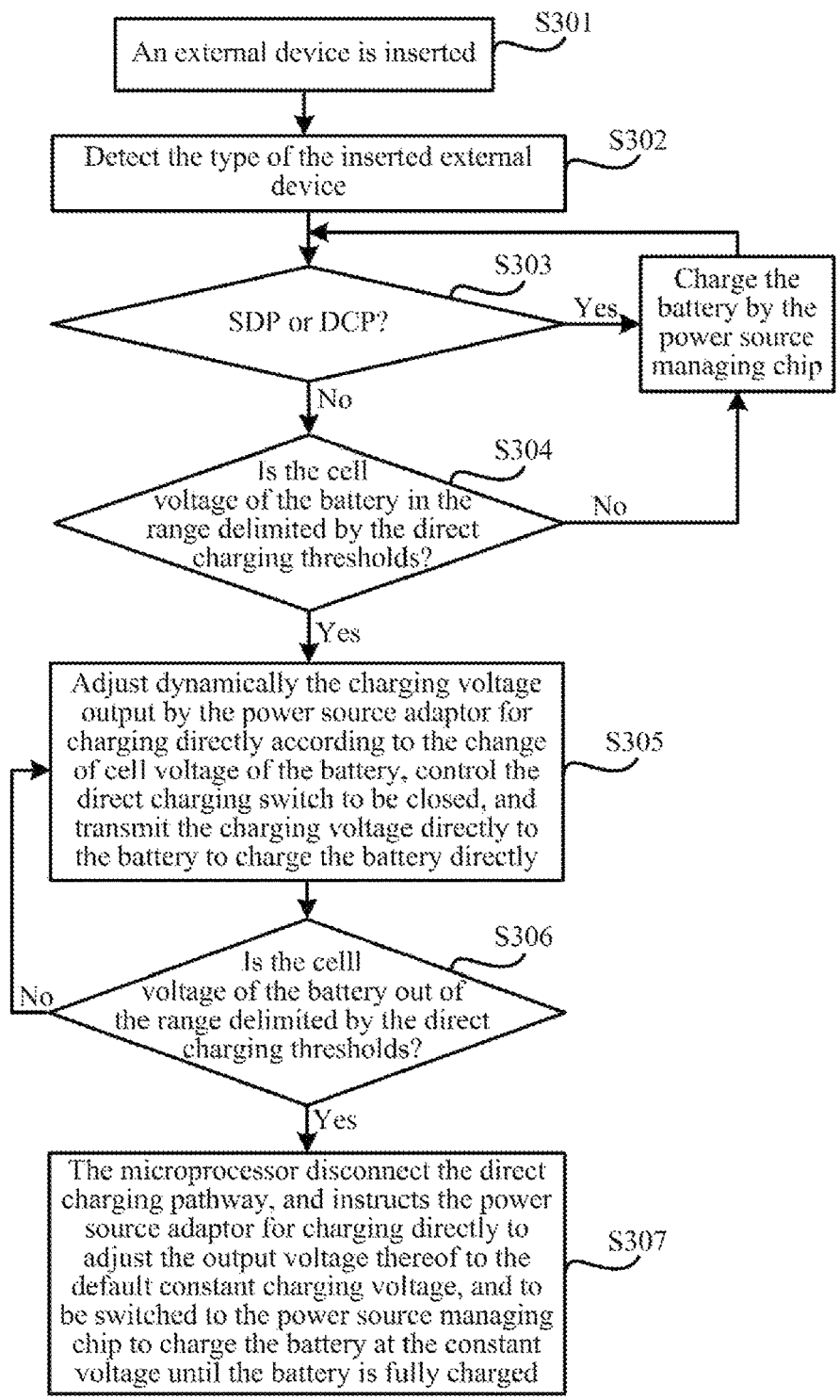
FIG. 3 is a flow chart of a process of a charging method designed for the mobile terminal illustrated in FIG. 1.

As illustrates in FIG. 3, the charging method generally involves the following steps:

S301. The mobile terminal detects whether an external device is inserted, and performs subsequent steps upon detecting an external device being inserted.

In this embodiment, whether an external device being inserted can be detected as in the prior art, for example, by detecting whether a DC power source accessing the power source pin VBUS of the USB interface Ji of the mobile terminal. In the traditional host charging mode SDP and normal power source adaptor charging mode DCP, the charging voltage output by the host and the normal power source adaptor is typically 5V; and the power source adaptor for charging directly can be configured to output by default the same constant charging voltage as the host and the normal power source adaptor, e.g., 5V constant charging voltage so that the mobile terminal can substantially determine whether the power source adaptor for charging directly is inserted.

Of course the 5V constant charging voltage here only relates to an embodiment, and for some mobile terminal to be charged at constant voltage of another volt value, the power source adaptor for charging directly will be simply configured to output by default the same constant charging voltage as the charging voltage output by the normal power source adaptor when the normal power source adaptor supplies power to the mobile terminal.

S302. The mobile terminal detects the type of the inserted external device.

In this embodiment, the mobile terminal operates by default without being charged directly, that is, the microprocessor in the mobile terminal controls by default the direct charging switch to be opened to have the power source pin VBUS of the USB interface Ji connected with the power source managing chip. Also the microprocessor controls the gating switch to be kept in the default state to have the differential data pins D+ and D− of the USB interface Ji connected with the differential data interfaces DP and DN of the microprocessor.

Whether the inserted external device is the host or the normal power source adaptor can be determined as in the existing BC1.2 charging type detection scheme. Of course this can alternatively be determined particularly as follows:

If the mobile terminal detects an external device being inserted into the charging interface thereof, then the microprocessor firstly determines whether the differential data pins D+ and D− thereof are shorted, and if so, then the mobile terminal determines that the inserted external device is the normal power source adaptor because the communication pins of the existing normal power source adaptor typically are configured to be shorted; otherwise, the mobile terminal communicates with the external device by USB through the microprocessor, and if the communication succeeds, then the mobile terminal determines that the inserted external device is the host because the existing host (particularly the computer host) typically is connected and communicates with and supplies power to the mobile terminal through the USB data line; otherwise, the inserted external device may be the power source adaptor for charging directly. In order to determine whether the inserted external device is the power source adaptor for charging directly, the microprocessor firstly controls the gating switch to operate to switch the differential data pins D+ and D− of the USB interface Ji to be connected with the UART interfaces TXD and RXD of the microprocessor. Then the microprocessor communicates with the external device in the UART communication mode, and if the communication succeeds, then the microprocessor determines that the inserted external device is the power source adaptor for charging directly; otherwise, the microprocessor will not start the charging mode or can further output an alert of "Inserted Device Can Not Be Identified".

Figure 4:
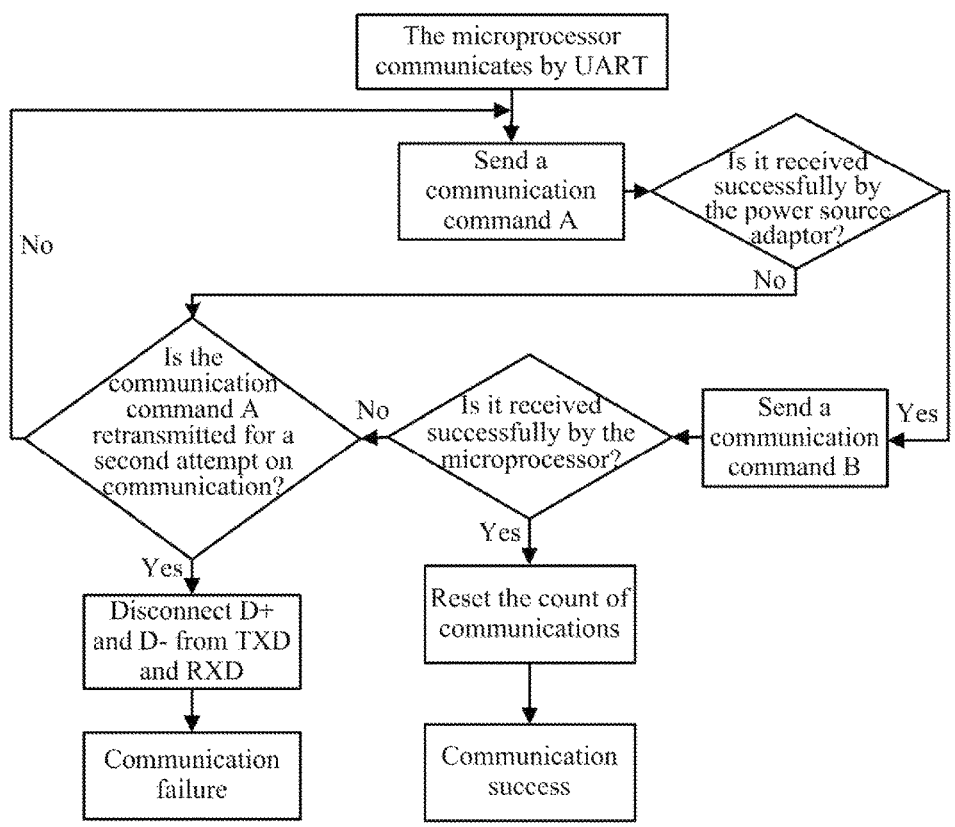
FIG. 4 is a flow chart of an embodiment of detecting communication between the mobile terminal and the power source adaptor for charging directly illustrated in FIG. 1.
Figure 5:
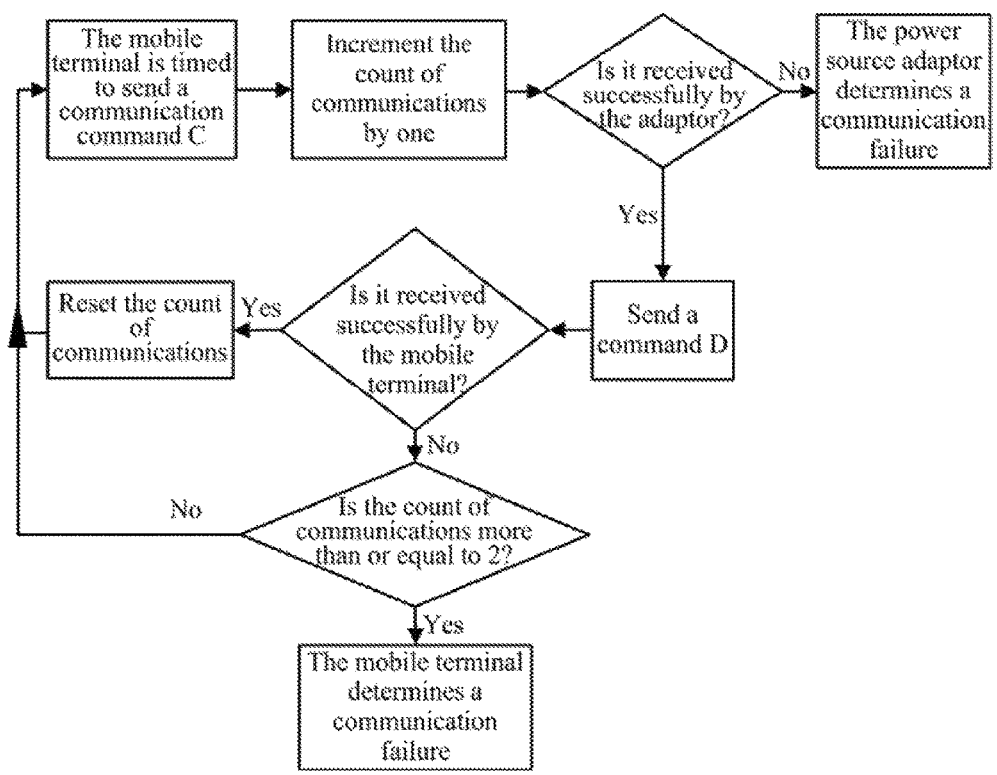
FIG. 5 is a flow chart of an embodiment of a timed detection mechanism of communication between the mobile terminal and the power source adaptor for charging directly illustrated in FIG. 1.

In order to enable a better switching mechanism and error-tolerant mechanism, in this embodiment, communication between the mobile terminal and the power source adaptor for charging directly can be detected preferably in the following flow as illustrated in FIG. 4: the microprocessor initiates a communication command A on its own initiative to the external power source adaptor after switching the communication interface of the microprocessor from the differential data interfaces DP and DN to the UART interfaces TXD and RXD, and also counts the number of communications. The power source adaptor for charging directly receiving successfully the communication command A can respond accordingly by sending a communication command B to the mobile terminal, and if the mobile terminal does not receive any valid communication command B, then the microprocessor firstly determines the count of communications at that time, and if the count of communications is less than 2, then the microprocessor retransmits the communication command A for a second attempt on communication; and if the count of communications is more than or equal to 2, then the microprocessor determines that the communication fails, and disconnects the differential data pins D+ and D− of the USB interface Ji of the mobile terminal from the UART interfaces TXD and RXD of the microprocessor to resume the original state where the differential data pins D+ and D− of the USB interface Ji are connected with the differential data pins DP and DN of the microprocessor. If the mobile terminal receives successfully the communication command B, then the microprocessor determines that the communication succeeds, and resets the count of communications, and thereafter starts a timed communication detecting mechanism as illustrated in FIG. 5.

In the timed communication detecting mechanism, the mobile terminal is timed to send a handshake instruction, e.g., a communication instruction C, to the power source adaptor for charging directly, and also increments the count of communications by one; and if the power source adaptor for charging directly receives successfully the communication instruction C, then it feeds immediately a response instruction back to the mobile terminal, for example, it sends a communication instruction D to the mobile terminal. If the mobile terminal receives successfully the communication instruction D, then the handshake succeeds, and the mobile terminal determines that the communication between them is normal, maintains the current charging process, resets the count of communications, and waits for arrival of a next timed detection period and then initiates again the communication instruction C. If the mobile terminal does not receive the communication instruction D, then the mobile terminal retransmits the communication instruction C to the power source adaptor for charging directly; and if both of the communications fail, then the mobile terminal determines that the power source adaptor for charging directly engaged therewith becomes abnormal. In order to ensure the safety of the mobile terminal, at this time the microprocessor has the connection line between the USB interface Ji of the mobile terminal and the internal system circuits thereof disconnected, and notifies the user of the abnormality of the externally connected power source adaptor to thereby alert the user.

S303. The mobile terminal enters a corresponding charging mode according to the detected type of the external device.

In this embodiment, if the inserted external device is detected as the host or the normal power source adaptor, then the battery is charged by the power source managing chip in the standard SDP charging mode (if the host is inserted) or the standard DCP charging mode (if the normal power source adaptor is inserted).

The microprocessor controls the direct charging switch to be kept in the defaulted Off state, and also starts the power source managing chip to receive the charging voltage input by the host or the normal power source adaptor, and to enter different charging phases according to current cell voltage of the battery. By way of an example, for a 4.2V chargeable battery (4.2V cell voltage of the battery being fully charged), if the cell voltage is less than 3.5V, then the power source managing chip enters a small-current pre-charging phase in which 500 mA charging current is output, and the battery is pre-charged at the small current. If the cell voltage of the battery lies between 3.5V and 4.1V, then the power source managing chip enters a constant-current charging phase in which 1 A or 1.5 A charging current is output, and the battery is charged at the constant current. The battery is charged in the constant-current charging phase in the majority of the entire charging process, and typically it takes approximately 90% of the entire charging period of time for the cell voltage of the battery to rise from 3.5V to 4.1V. If the cell voltage of the battery rises above 4.1V, then the power source managing chip enters a constant-voltage charging phase in which constant voltage is output to charge the battery, and at this time the charging current is gradually decreased with the rising voltage of the battery until the battery is fully charged.

If the inserted external device is detected as the power source adaptor for charging directly, then the mobile terminal operates in a subsequent rapid charging mode.

S304. The mobile terminal determines whether the cell voltage of the battery lies in a range delimited by direct charging thresholds, and if so, then the mobile terminal performs a subsequent large-current direct charging process; otherwise, the battery is charged by the source power source managing chip.

In this embodiment, the direct charging thresholds (a lower voltage threshold S1 and an upper voltage threshold S2) can be determined particularly dependent upon the real condition of the battery to preferably agree with the voltage range of the battery corresponding to the constant-current charging phase in the normal DCP charging mode. For example, the lower voltage threshold S1 and the upper voltage threshold S2 of the 4.2V chargeable battery above can be set to S1=3.5V and S2=4.1V. If the cell voltage $V_{bat\_real}$ of the battery is $V_{bat\_real} < 3.5V$ or $V_{bat\_real} > 4.1V$, then the microprocessor controls the direct charging switch to be kept in the default Off state, and also starts the power source managing chip to receive the constant charging voltage input by the power source adaptor for charging directly, e.g., DC 5V charging voltage, to pre-charge the battery at small current (for $V_{bat\_real} < 3.5V$) or at constant voltage (for $V_{bat\_real} > 4.1V$), that is, the battery is charged in the same charging mode as the host and the normal power source adaptor. If the cell voltage Vbat_real of the battery is detected in the range [3.5V, 4.1V] delimited by the direct charging thresholds, then the mobile terminal enters the subsequent direct charging process.

S305. The mobile terminal communicates with the power source adaptor for charging directly via the UART interfaces thereof, adjusts dynamically the charging voltage output by the power source adaptor for charging directly according to the change of cell voltage of the battery, and controls the direct charging switch to be closed to short the power source managing chip so that the power source managing chip stops operating, and the charging voltage is transmitted directly to the battery to charge the battery directly.

In this embodiment, the charging voltage can be adjusted dynamically in any one of the following three preferred designed approaches:

In a first designed approach, a reference table of relationship between the cell voltage of the battery and the target charging voltage is preset in the mobile terminal, the cell voltage of the battery is detected, and the reference table is searched using the cell voltage for the target charging voltage corresponding to the cell voltage to control the voltage output of the power source adaptor for charging directly.

The cell voltage of the battery can be divided into several intervals according to the range [S1, S2] delimited by the preset direct charging thresholds, for example, the cell voltage is divided into N intervals at a step of 100 mV, where N=(S2−S1)/100 mV. For each interval, a target charging voltage value Vout, a target charging current value Itarg, and a charging current maximum value Imax corresponding to the cell voltage in the interval are predetermined to create a reference table, and the reference table is stored in the microprocessor, or in a memory in the mobile terminal, connected with the microprocessor for being invoked by the microprocessor.

Figure 6:
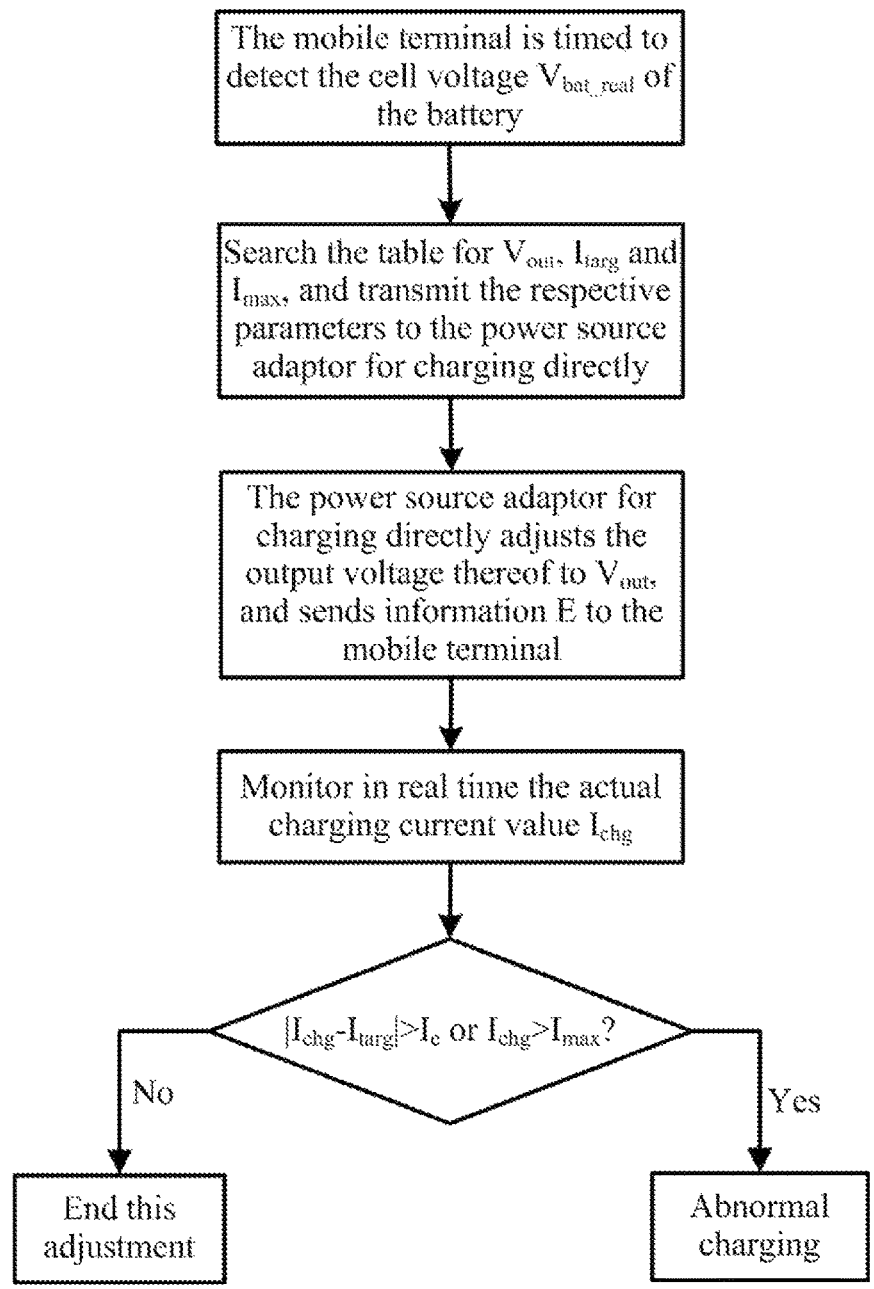
FIG. 6 is a flow chart of control in an embodiment of a direct charging control strategy using a lookup table.

After entering the direct charging process, as illustrated in FIG. 6, the microprocessor is timed to detect the cell voltage Vbat_real of the battery, searches the reference table using the detected cell voltage Vbat_real, determines the cell voltage interval in which the cell voltage Vbat_real lies, and then searches using the determined interval for the target charging voltage value Vout, the target charging current value Itarg, and the charging current maximum value Imax corresponding to the interval. Thereafter the microprocessor conducts UART communication with the power source adaptor for charging directly, and sends the target charging voltage value Vout, the target charging current value Itarg, and the charging current maximum value Imax to the power source adaptor for charging directly.

At the power source adaptor for charging directly side, the power source adaptor for charging directly adjusts the resistance value of the valid resistor of the digital potentiometer thereof according to the received target charging voltage value Vout to thereby change the charging voltage output by the AC-DC unit thereof to the target charging voltage value Vout. At the end of the adjusting, the power source adaptor for charging directly sends information E to the mobile terminal, monitors in real time the actual charging current Ichg output by the AC-DC unit, through the current monitoring chip, and if |Ichg−Itarg|>Ie (Ie represents a controllable range of the difference between the actual charging current value of the power source adaptor for charging directly and the target charging current value, and can be preferably set to Ie=500 mA in this embodiment), or Ichg>Imax, then the power source adaptor for charging directly determines abnormal charging. At this time in order to ensure the safety in charging, the power source adaptor for charging directly outputs the invalid enable signal through the controller therein, as illustrated in FIG. 2, to control the boosting circuit to stop the switch voltage from being output, and to further control the pair of MNOS transistors Q1 to be switched off to thereby block the charging power source output by the AC-DC unit from being transmitted to the mobile terminal. If |Ichg−Itarg|≤Ie and Ichg≤Imax, then the power source adaptor for charging directly ends this adjusting process, and charges directly at large current the battery in the mobile terminal using the adjusted charging voltage, where the charging current here can rise beyond 3500 mA, to thereby significantly speed up charging.

The following preferred particular implementation to create the reference table is proposed in this embodiment:

A number i of intervals, denoted as xi1~xi2, are set for the cell voltage in the range of [S1, S2];

For each of the intervals [$x_{i1}$, $x_{i2}$], a target charging voltage value $V_{out}$, a target charging current value $I_{targ}$, and a charging current maximum value $I_{max}$ corresponding to the interval are calculated respectively in the equations of:

$$V_{out} = V_{bat\_real} + I_{targ} * (R_{line} + R_{board} + R_{bat}) \quad (1)$$

$$I_{targ} = I_{max} - \Delta I \quad (2)$$

$$I_{max} = \min((V_{bat\_max} - V_{bat\_real})/R_{bat}, I_{allow}) \quad (3)$$

Where $R_{line}$ represents a resistance value on the charging line; $R_{board}$ represents a resistance value on a circuit board of the mobile terminal; $R_{bat}$ represents an inner resistance value of the battery, which can be experimentally measured; $V_{bat\_max}$ represents the maximum terminal voltage value supported by the battery, which shall be determined by a hardware platform on which the mobile terminal operates, and which shall be less than a specified safe value $V_{bat\_safe}$ of the terminal voltage of the battery; $I_{allow}$ represents the maximum safe charging current value selected while ensuring the safety of the battery being charged; and $\Delta I$ represents a preset difference in current, which preferably lies in the range of [150 mA, 250 mA]; and The reference table is created from the parameters Vbat_real, Vout, Itarg and Imax.

In this embodiment, in order not to measure $R_{line}$ and $I_{max}$, the sum of the resistance value $R_{line}$ on the charging line, and the resistance value $R_{board}$ on the circuit board of the mobile terminal can be calculated in the equation of:

$$R_{line} + R_{board} = (V_{out} - V_{bat})/I_{chg} \quad (4)$$

Where $V_{bat}$ represents the terminal voltage of the battery. That is, the terminal voltages $V_{bat}$ of the battery, and the charging currents $I_{chg}$, for the different target charging voltage values $V_{out}$ can be measured in reality, and substituted into Equation (4) to calculate the sum of $R_{line}$ and $R_{board}$, which is substituted into Equation (1) to calculate the target charging voltage value $V_{out}$.

In a preferred designed implementation of this embodiment, the target charging voltage value Vout and the charging current maximum value Imax corresponding to each interval [xi1, xi2] can be calculated preferably as follows: a lower bound xi1 of the cell voltage in the interval is used as Vbat_real and substituted into Equation (1) to calculate the target charging voltage value Vout corresponding to the interval; an upper bound xi2 of the cell voltage in the interval is used as Vbat_real and substituted into Equation (3) to calculate the charging current maximum value Imax corresponding to the interval; and further the target charging current value Itarg is derived from calculated Imax in Equation (2), and the reference table is created.

By way of an example, still taking the 4.2V chargeable battery as an example, for the system powered by the battery, from the perspective of the safety of voltage to power the device, the terminal voltage Vbat of the battery shall not be more than a specific Vbat_max dependent upon the platform, and less than the specified safe value Vbat_safe of the terminal voltage of the battery. If the safe value Vbat_safe of the terminal voltage of the battery is Vbat_safe=4500 mV, then Vbat_max=4470 mV can be taken, so the terminal voltage Vbat of the battery is Vbat=Vbat_real+Ichg*Rbat≤4470.

From the perspective of the safety of the battery, if the maximum safe charging current value is taken as $I_{allow}$=4000 mA, then the charging current maximum value $I_{max}$ is calculated as follows in Equation (3):

$$I_{max} = \min((4470 - V_{bat\_real})/R_{bat}, 4000) \quad (5)$$

If the inner resistance $R_{bat}$ of the battery is $R_{bat}$=100 mΩ, the other impedance is $R_{line}+R_{board}$=100 mΩ, and the range delimited by the preset direct charging thresholds of the battery is [3500 mV, 4100 mV] at a step of 100 mV, then the range [3500 mV, 4100 mV] delimited by the direct charging thresholds can be divided into 6 intervals; an upper bound of the cell voltage in each interval is substituted into Equation (5) to calculate the charging current maximum value $I_{max}$; the target charging current value $I_{targ}$ is derived from calculated $I_{max}$ in Equation (2), and ΔI=200 mA is taken in this embodiment; and a lower bound of the cell voltage in each interval is substituted into Equation (1) to calculate the target charging voltage value $V_{out}$ from calculated $I_{targ}$, so the desirable reference table is created as follows:

| $V_{bat\_real}$ (mV) | $V_{out}$ (mV) | $I_{targ}$ (mA) | $I_{max}$ (mA) |
|---|---|---|---|
| 3500-3600 | 4260 | 3800 | 4000 |
| . . . | . . . | . . . | . . . |
| 4000-4100 | 4700 | 3500 | 3700 |

The reference table reflects to some extent the correspondence relationship between the cell voltage of the battery, and the charging current and the charging voltage output by the adaptor, but there may be a minor error relative to the real correspondence relationship, so the battery can be experimentally charged, the charging voltage varying with different charging current is recorded, and the values of the parameters in the reference table are adjusted, for example, the values of the respective parameters in the reference table are adjusted to their ideal values by averaging them.

The target charging voltage obtained by looking up from the table is a theoretical value, and in reality, the inner resistance of the battery, and the impedance on the line may vary with temperature, aging, and other factors, so the real charging current value $I_{chg}$ output by the power source adaptor for charging directly may deviate to some extent from the target charging current value $I_{targ}$, thus resulting in some influence upon the charging speed. In order to raise the charging current as much as possible in an allowable range to further speed up charging, in this embodiment, a charging current self-adjusting algorithm is introduced at the power source adaptor for charging directly side, that is, after the power source adaptor for charging directly adjusts the output voltage to $V_{out}$, if $I_{targ}-I_c \leq I_{chg} < I_{targ}$, then $V_{out}=V_{out}+\Delta V$ is adjusted progressively so that the actual charging current value $I_{chg}$ output by the power source adaptor for charging directly approaches progressively the target charging current value $I_{targ}$.

In this embodiment, Vout can be adjusted preferably for five times by an amount which can be estimated in Equation (1), and if Vbat_real and R (including the inner resistance of the battery, the line resistance, and all the other impedances) are invariable, then ΔV=ΔI*R. In this embodiment, ΔV is preferably set to ΔV=10 mV.

In a second designed approach, a reference table of relationship between the cell voltage of the battery and the target charging voltage is preset at the power source adaptor for charging directly side, and the power source adaptor for charging directly searches the reference table using the received cell voltage (detected and provided by the mobile terminal) for the target charging voltage value corresponding to the cell voltage. Thereafter the power source adaptor for charging directly adjusts the output voltage thereof to the target charging voltage value to charge directly the battery built in the mobile terminal at large current.

Reference can be made for the related description in the first designed approach above for details about creating the reference table.

After entering the direct charging process, at the mobile terminal side, the microprocessor is timed to detect the cell voltage Vbat_real of the battery, conducts UART communication with the power source adaptor for charging directly, and is timed to send the detected cell voltage Vbat_real to the power source adaptor for charging directly.

At the power source adaptor for charging directly side, the power source adaptor for charging directly searches the stored reference table thereof using the received core voltage Vbat_real, determines the cell voltage interval in which the cell voltage Vbat_real lies, and then searches using the determined interval for the target charging voltage value Vout, the target charging current value Itarg, and the charging current maximum value Imax corresponding to the interval. Then the controller adjusts the resistance value of the valid resistor of the digital potentiometer to thereby change the charging voltage output by the AC-DC unit thereof to the target charging voltage value Vout. At the end of the adjusting, the power source adaptor for charging directly sends information E to the mobile terminal, and sends Itarg and Imax to the mobile terminal for detection of abnormal charging. At the same time the power source adaptor for charging directly monitors in real time the actual charging current value Ichg output by the AC-DC unit, through the current monitoring chip thereof, and if |Ichg−Itarg|>Ie or Ichg>Imax, then the power source adaptor for charging directly determines abnormal charging, disconnects the charging power source from being output, and stops the mobile terminal from being charged. If |Ichg−Itarg|≤Ie and Ichg≤Imax, then the power source adaptor for charging directly ends this adjusting process.

Also the charging current self-adjusting algorithm described in the first designed approach above can be introduced at the power source adaptor for charging directly side so that the actual charging current value Ichg output by the power source adaptor for charging directly can approach progressively the target charging current value Itarg to thereby further speed up charging.

The table-lookup approach above relating to segmented constant-current-like charging can reduce the count of times that the output voltage of the power source adaptor for charging directly is adjusted, but the output voltage may be constant for a period of time, and the charging current will be decreasing gradually with the ever rising cell voltage of the battery, thus resulting in some influence upon the charging speed of the battery.

In order to enable the charging current to be maintained at a stable high level, direct charging control by following in real time the varying cell voltage is proposed in this embodiment as described in the following third designed approach.

In the third designed approach, the target charging voltage value is adjusted in real time by following dynamically the varying cell voltage of the battery.

Figure 7:
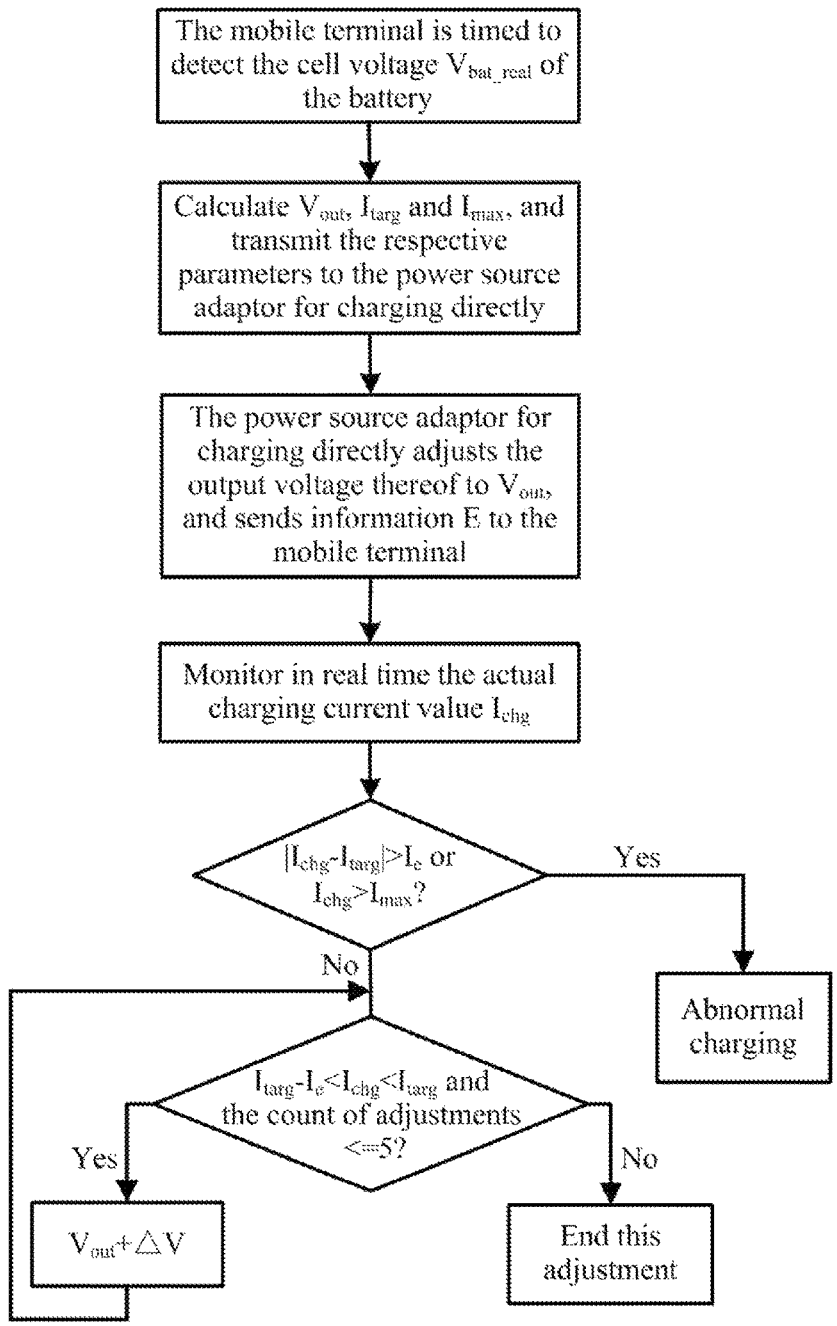
FIG. 7 is a flow chart of control in an embodiment of a voltage-following direct charging control strategy.

As illustrated in FIG. 7, after entering the direct charging process, the microprocessor in the mobile terminal is timed to detect the cell voltage Vbat_real of the battery, calculates the target charging voltage value Vout, the target charging current value Itarg, and the charging current maximum value Imax in Equations (1) to (4), and sends these values to the power source adaptor for charging directly.

The power source adaptor for charging directly adjusts the resistance value of the valid resistor of the digital potentiometer thereof according to the received target charging voltage value Vout to thereby adjust the charging voltage output by the AC-DC unit to the target charging voltage value Vout. At the end of the adjusting, the power source adaptor for charging directly sends information E to the mobile terminal, and also monitors the charging current Ichg output by the power source adaptor for charging directly, through the current monitoring chip, and if |Ichg−Itarg|>Ie or Ichg>Imax, then the power source adaptor for charging directly determines abnormal charging, disconnects the charging power source from being output by the power source adaptor for charging directly to the outside, and notifies the mobile terminal of abnormal charging. If |Ichg−Itarg|≤Ie and Ichg≤Imax, then the power source adaptor for charging directly ends this adjusting process, or starts the charging current self-adjusting algorithm above to finely adjust the charging voltage for at most five times (or another number of times), so that the actual charging current value Ichg output by the power source adaptor for charging directly approaches progressively the target charging current value Itarg to thereby speed up charging as much as possible.

S306. The mobile terminal determines whether the cell voltage of the battery exceeds the range delimited by the direct charging thresholds, and if not, then the flow returns to the step S305; otherwise, the flow proceeds to a subsequent step.

S307. The microprocessor controls the direct charging switch to be opened to disconnect the direct charging pathway, and instructs the power source adaptor for charging directly to adjust the output voltage thereof to the default constant charging voltage, e.g., 5V direct charging voltage, and to start the power source managing chip to receive the constant charging voltage to charge the battery at the constant voltage until the battery is fully charged.

In order to ensure the safety of the mobile terminal being charged, the following charging abnormality handling mechanism is proposed in this embodiment:

1. At the Mobile Terminal Side (1) The mobile terminal detecting that it is being powered by the power source adaptor for charging directly is timed to send a handshake instruction to the power source adaptor for charging directly, and waits for a preset period of time until the power source adaptor for charging directly feeds back response information, and if the mobile terminal receives the response information, then the handshake succeeds, and the mobile terminal is further charged; otherwise, the mobile terminal determines abnormal charging, disconnects the connection line between the charging interface of the mobile terminal and the system circuit, and notifies the user of the power source adaptor being abnormal;

(2) After entering the direct charging process, if the mobile terminal detects that the power source adaptor for charging directly is pulled out suddenly, then it disconnects the direct charging pathway between the charging interface of the mobile terminal and the battery, and has the charging interface connected with the power source managing chip;

(3) After entering the direct charging process, if the mobile terminal detects that the terminal voltage of the battery exceeds the preset threshold (the threshold of the terminal voltage of the 4.2V chargeable battery can be preset to 4.6V), then it disconnects the direct charging pathway between the charging interface of the mobile terminal and the battery, and instructs the power source adaptor for charging directly to be switched to the default constant charging voltage for output, e.g., 5V DC voltage;

(4) After entering the direct charging process, the mobile terminal monitors in real time the received actual charging current value Ichg, and if the absolute value of the difference between Ichg and Itarg goes beyond the preset controllable range of the difference, then it disconnects the direct charging pathway between the charging interface of the mobile terminal and the battery, and switches to the power source managing chip to charge the battery; and (5) After entering the direct charging process, the mobile terminal monitors in real time the received actual charging current value Ichg, and if Ichg is more than Imax, then it disconnects the direct charging pathway between the charging interface of the mobile terminal and the battery, and notifies the user of the power source adaptor being abnormal 2. At the Power Source Adaptor for Charging Directly Side (1) The power source adaptor for charging directly obtaining the target charging voltage value Vout, the target charging current value Itarg, and the charging current maximum value Imax monitors in real time its actual output charging current value Ichg, and if the absolute value of the difference between Ichg and Itarg goes beyond the preset controllable range of the difference, then the power source adaptor for charging directly stops the charging power source from being out, and flicks a lamp to alert the user;

(2) After entering the direct charging process, the power source adaptor for charging directly monitors in real time its actual output charging current value Ichg, and if Ichg is more than Imax, then it determines abnormal charging, and disconnects the charging power source from being output to avoid the mobile terminal from being damaged due to being further powered.

Of course, the mobile terminal and the power source adaptor for charging directly can alternatively exchange data wirelessly with each other as illustrated in FIG. 2, for example, firstly handshake communication between the mobile terminal and the power source adaptor for charging directly can be conducted in the UART communication mode for the mobile terminal to identify accurately the power source adaptor for charging directly. Then in order to further improve the accuracy of the respective parameters being transmitted in charging, the data can be exchanged wirelessly instead to thereby improve the stability of communication. A wireless communication module, e.g., Bluetooth, WiFi, or another wireless communication module, can be arranged in the controlling unit of the power adaptor for charging directly to be connected with the controller, possibly another branch of UART interfaces TX1 and RX1 of the controller; and a matching wireless communication module, e.g., a Bluetooth chip, can be arranged in the mobile terminal to be connected with the microprocessor. If the mobile terminal needs to exchange data with the power adaptor for charging directly, then communication data generated by the microprocessor and the controller can be sent to the wireless communication modules connected therewith for conversion into a wireless signal sent to their counterparts. Due to the wireless communication, such a difference in ground level between the power source adaptor and the mobile terminal can be addressed that arises from a significant voltage drop across a charging line between the power source adaptor and the mobile terminal being charged at large current, where the difference in ground level would otherwise have degraded a quality of waveform of the communication signal, thus resulting in the instability of communication.

The charging method according to this application can be widely applied to a cell phone, a tablet computer, a notebook computer, a mobile power source, and other mobile terminals so as to satisfy different charging demands of the user.

An embodiment of the application further provides a mobile terminal including a battery, a USB interface, a microprocessor, a direct charging switch, and a power source managing chip, where the battery is configured to store electrical energy; the USB interface is configured to be engaged with an external device; the microprocessor is configured, upon detecting an external device being inserted into the USB interface, to identify whether the inserted external device is a power source adaptor for charging directly, in a UART communication mode, if the external device is the power source adaptor for charging directly, to control charging voltage output by the power source adaptor for charging directly to charge the battery directly, and the microprocessor is further configured to output a switch control signal; and the direct charging switch is configured to control the mobile terminal to be switched between a charging mode in which the battery is charged through the power source managing chip, and a charging mode in which the battery is charged through the direct charging switch, in response to the switch control signal. In an actual application, the mobile terminal according to the application can be embodied in the structure of the mobile terminal in FIG. 1.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power source adaptor for charging directly, the power source adaptor comprising:
a charging interface configured to be externally connected with a mobile terminal having a battery, and comprising a power source pin, a ground pin, and two communication pins disconnected from each other;
an AC to DC converting unit configured to convert an external AC input power source into a charging voltage required by the mobile terminal, and output the charging voltage via the charging interface; and
a controlling unit in connection with the charging interface, and configured to:
conduct UART communication with the mobile terminal through the communication pins, after the charging interface is connected with the mobile terminal;
adjust the charging voltage output by the AC to DC converting unit,
receive a voltage of the battery sent by the mobile terminal;
if the voltage of the battery is in a range delimited by preset direct charging thresholds, search a preset reference table using the voltage of the battery for a target charging voltage value corresponding to the current voltage of the battery, feedback the target charging voltage value to the mobile terminal, and adjust the charging voltage output by the AC to DC converting unit to the target charging voltage value;
if the voltage of the battery is out of the range delimited by the preset direct charging thresholds, control the AC to DC converting unit to output a default constant charging voltage;
if the voltage of the battery is in the range delimited by the preset direct charging thresholds, receive a target charging current value $I_{targ}$ and a charging current maximum value $I_{max}$ sent b the mobile terminal or search the preset reference table for a target charging current value $I_{targ}$ and a charging current maximum value $I_{max}$ corresponding to the current voltage of the battery;
detect a charging current $I_{chg}$ output via the charging interface, and
if $I_{targ}-I_e \le I_{chg} < I_{targ}$, control the AC to DC converting unit to progressively increase the charging voltage output by the AC to DC converting unit by an amount of $\Delta V$, so that the charging current $I_{chg}$ output via the charging interface approaches the target charging current value $I_{targ}$, or if the absolute value of the difference between the charging current $I_{chg}$ and the target charging current value $I_{targ}$ is more than $I_e$ or the charging current $I_{chg}$ is more than the charging current maximum value $I_{max}$, stop the charging voltage from being output to the charging interface;
wherein $I_e$ represents a controllable range of the difference between the charging current $I_{chg}$ of the power source adaptor and the target charging current value $I_{targ}$.

2. The power source adaptor according to claim 1, wherein the AC to DC converting unit comprises a rectifying circuit, a transformer, a synchronous rectification controller, and a PWM controller, wherein the controlling unit comprises a controller and a digital potentiometer, and wherein:
the rectifying circuit is configured to rectify the AC input power source into a DC power source, and output the DC power source to the transformer for transformation into the charging voltage; the controller has UART interfaces thereof connected with the communication pins to conduct UART communication with the mobile terminal, and is configured to generate a voltage adjusting instruction according to the charging voltage required by the mobile terminal and send the voltage adjusting instruction to the digital potentiometer to change a resistance value of a valid resistor of the digital potentiometer; the digital potentiometer includes a resistor body connected in series with a current-limiting resistor and between an anode of a secondary coil of the transformer and ground, the resistor body includes a central tap connected with a reference voltage pin of the synchronous rectification controller; and the synchronous rectification controller is configured to adjust a duty ratio of a PWM signal output by the PWM controller according to the varying resistance value of the valid resistor of the digital potentiometer, and control a switching time of the transformer based on the PWM signal to adjust a volt value of the charging voltage output by the transformer.

3. The power source adaptor according to claim 2, wherein the AC to DC converting unit comprises:
   an optical coupler connected with the synchronous rectification controller and the PWM controller, and configured to optic-electrically isolate a signal output by the synchronous rectification controller; and
   a power MOS transistor connected between a cathode of the secondary coil of the transformer and the ground pin of the charging interface, wherein the synchronous rectification controller is configured to control the power MOS transistor to switch on and off to rectify the charging voltage output by the transformer.

4. The power source adaptor for charging directly according to claim 2, wherein the controlling unit comprises:
   a current monitoring unit configured to monitor the charging current $I_{chg}$ in real time, and to feed the charging current back to the controlling unit; and
   a switch circuit connected between the AC to DC converting unit and the charging interface, wherein the controller is configured to control the switch circuit upon detecting that the charging current $I_{chg}$ is abnormal, and wherein the switch circuit is configured to disconnect a charging voltage transmission line between the AC to DC converting unit and the charging interface to stop the charging voltage from being output.

5. The power source adaptor according to claim 4, wherein the current monitoring unit comprises:
   a current sampling resistor connected in series in the transmission line of the charging voltage; and
   a current monitoring chip connected across the current sampling resistor, and configured to detect a difference in voltage across the current sampling resistor, amplify the difference in voltage, and output in a sample voltage for transmission to the controller.

6. The power source adaptor according to claim 5, wherein the current monitoring unit comprises:
   a bleeder circuit connected with the current monitoring chip, and configured to bleed the sample voltage output by the current monitoring chip to adjust the sample voltage in an interface voltage range acceptable to the controller, and transmit the sample voltage to an ADC interface of the controller to detect a current value output via the charging interface.

7. The power source adaptor according to claim 4, wherein the switch circuit comprises:
   a switch transistor configured to support a large current passing, switch on and connect in the transmission line of the charging voltage; and
   a boosting circuit connected with the controller, and configured, upon reception of a valid enable signal output by the controller, to output a higher switch voltage than a volt value of the charging voltage, and transmit the switch voltage to a control pole of the switch transistor to control the switch transistor to connect the transmission line of the charging voltage, and wherein, upon detecting that a current value output via the charging interface exceeds an allowable current range, the controller is configured to output an invalid enable signal to the boosting circuit, control the boosting circuit to stop the switch voltage from being output, and control the switch transistor to disconnect the transmission line of the charging voltage to stop the charging voltage from being output.

8. The power source adaptor according to claim 2, wherein the controlling unit includes:
   a wireless communication module connected with the controller, and configured to exchange data between the controller and the mobile terminal.

9. A mobile terminal comprising:
   a battery configured to store electrical energy;
   a USB interface configured to engage an external device;
   a microprocessor configured to, upon detecting an external device is inserted into the USB interface, identify whether the inserted external device is a power source adaptor for charging directly in a UART communication mode, if the external device is the power source adaptor for charging directly, control a charging voltage output by the power source adaptor to charge the battery, and output a switch control signal; and
   a direct charging switch configured to control the mobile terminal to be switched between a charging mode in which the battery is charged through the power source managing chip in the mobile terminal, and a charging mode in which the battery is charged through the direct charging switch, in response to the switch control signal;
   wherein the microprocessor is further configured to:
     send a voltage of the battery to the power source adaptor,
     if the voltage of the battery is in a range delimited by preset direct charging thresholds, control the power source adaptor to search a preset reference table using the voltage of the battery for a target charging voltage value corresponding to the current voltage of the battery, feedback the target charging voltage value to the mobile terminal, and adjust the charging voltage output by the power source adaptor to the target charging voltage value;
     if the voltage of the battery is out of the range delimited by the preset direct charging thresholds, control the power source adaptor to output default constant charging voltage;
     if the voltage of the battery is in the range delimited by the preset direct charging thresholds, send a target charging current value $I_{targ}$ and a charging current maximum value $I_{max}$ to the power source adaptor, or control the power source adaptor to search the preset reference table for a target charging current value $I_{targ}$ and a charging current maximum value $I_{max}$ corresponding to the current voltage of the battery;
     control the power source adaptor to detect a charging current $I_{chg}$, and if $I_{targ}-I_e \leq I_{chg} < I_{targ}$, Progressively increase the charging voltage output by the power source adaptor by an amount of $\Delta V$, so that the charging current output via the power source adaptor approaches the target charging current value $I_{targ}$, or if the absolute value of the difference between the charging current $I_{chg}$ and the target charging current value $I_{targ}$ is more than $I_e$ or the charging current $I_{chg}$ is more than the charging current maximum value $I_{max}$, stop the charging voltage from being output;
   wherein $I_e$ represents a controllable range of the difference between the charging current $I_{chg}$ of the power source adaptor and the target charging current value $I_{targ}$.

* * * * *